(12) United States Patent
Dittmann et al.

(10) Patent No.: US 10,898,302 B2
(45) Date of Patent: Jan. 26, 2021

(54) MULTI-LAYERED ZIRCONIA DENTAL MILL BLANK AND PROCESS OF PRODUCTION

(71) Applicant: 3M INNOVATIVE PROPERTIES COMPANY, St. Paul, MN (US)

(72) Inventors: Rainer K. Dittmann, Munich (DE); Hans R. Schnagl, Jengen (DE); Grit Kindler, Munich (DE); Björn Theelke, Landsberg am Lech (DE); Michael Sogl, Seefeld (DE); Michaela Urban, Seefeld (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/095,433

(22) PCT Filed: Oct. 21, 2017

(86) PCT No.: PCT/US2017/028717
§ 371 (c)(1),
(2) Date: Oct. 22, 2018

(87) PCT Pub. No.: WO2017/189344
PCT Pub. Date: Nov. 2, 2017

(65) Prior Publication Data
US 2019/0231494 A1    Aug. 1, 2019

(30) Foreign Application Priority Data
Apr. 25, 2016    (EP) .................................... 16166782

(51) Int. Cl.
*A61C 13/00*    (2006.01)
*A61C 13/083*    (2006.01)
(Continued)

(52) U.S. Cl.
CPC ........ *A61C 13/0022* (2013.01); *A61C 13/083* (2013.01); *A61C 13/082* (2013.01); *C04B 35/48* (2013.01); *C04B 2235/9661* (2013.01)

(58) Field of Classification Search
None
See application file for complete search history.

(56) References Cited

U.S. PATENT DOCUMENTS

| 4,970,032 A | 11/1990 | Rotsaert |
| 5,151,044 A | 9/1992 | Rotsaert |

(Continued)

FOREIGN PATENT DOCUMENTS

| CN | 102285795 | 12/2011 |
| CN | 102228408 | 3/2013 |

(Continued)

OTHER PUBLICATIONS

International Search Report for PCT International Application No. PCT/US2017/028717, dated Jul. 7, 2017, 4 pages.

*Primary Examiner* — David Sample
*Assistant Examiner* — Elizabeth Collister
(74) *Attorney, Agent, or Firm* — 3M IPC

(57) ABSTRACT

The invention relates to a porous multi-layered coloured zirconia dental mill blank comprising a bottom layer B having the composition COMP-B which comprises ceramic components CER-COMP-B, colouring components COL-COMP-B and stabilizing components STAB-COMP-B, a top layer E having the composition COMP-E which comprises ceramic components CER-COMP-E, colouring components COL-COMP-E stabilizing components STAB-COMP-E, at least one intermediate layer Ex having the composition COMP-E of top layer E, at least one intermediate layer Bx having the composition COMP-B of bottom layer B, x being an integer and indicating the number of intermediate layers, wherein the layers with compositions (Continued)

COMP-B and COMP-E are arranged in alternating order, and wherein the thickness of the individual layers B, Bx is decreasing from bottom to top and the thickness of the individual layers E, Ex is decreasing from top to bottom. The dental mill blank can be used for producing dental articles.

14 Claims, 2 Drawing Sheets

(51) Int. Cl.
*A61C 13/08* (2006.01)
*C04B 35/48* (2006.01)

(56) References Cited

U.S. PATENT DOCUMENTS

| | | |
|---|---|---|
| 5,555,798 A | 9/1996 | Miyashita |
| 5,939,211 A | 8/1999 | Mormann |
| 6,379,593 B1 | 4/2002 | Dotzmann |
| 6,618,717 B1 | 9/2003 | Karadimitriou |
| 7,604,759 B2 | 10/2009 | Gubler |
| 7,686,989 B2 | 3/2010 | Van Der Zel |
| 7,981,531 B2 | 7/2011 | Rheinberger |
| 8,025,992 B2 | 9/2011 | Engels |
| 8,034,261 B2 | 10/2011 | Kim |
| 8,034,264 B2 | 10/2011 | Ritzberger |
| 8,173,562 B2 | 5/2012 | Noland |
| 8,178,012 B1 | 5/2012 | Khan |
| D674,095 S | 1/2013 | Ganley |
| D675,325 S | 1/2013 | Ganley |
| 8,483,857 B2 | 7/2013 | Orth |
| 8,541,329 B2 | 9/2013 | Ritzberger |
| 8,551,622 B2 | 10/2013 | Ganley |
| 8,568,897 B2 | 10/2013 | Ganley |
| 8,632,889 B2 | 1/2014 | Thiel |
| 8,691,122 B2 | 4/2014 | Rheinberger |
| 8,721,336 B2 | 5/2014 | Rheinberger |
| 8,722,555 B2 | 5/2014 | Yamashita |
| 8,785,008 B2 | 7/2014 | Yamashita |
| 8,796,166 B2 | 8/2014 | Noland |
| 8,841,223 B2 | 9/2014 | Jahns et al. |
| D714,943 S | 10/2014 | Ganley |
| 8,936,469 B2 | 1/2015 | Smith |
| 8,936,848 B2 | 1/2015 | Jung |
| 8,940,402 B2 | 1/2015 | Giordano |
| D722,169 S | 2/2015 | Ganley |
| 9,249,058 B2 | 2/2016 | Yamashita |
| 9,309,157 B2 | 4/2016 | Fujisaki |
| 9,554,881 B2 | 1/2017 | Wang et al. |
| 9,687,325 B2 | 6/2017 | Park |
| 9,737,383 B2 | 8/2017 | Fujisaki |
| 9,757,217 B2 | 9/2017 | Burke |
| 10,065,895 B2 | 9/2018 | Franke et al. |
| 2002/0076530 A1 | 6/2002 | MacDougald |
| 2004/0145070 A1 | 7/2004 | Van Der Zel |
| 2006/0008774 A1 | 1/2006 | Orth |
| 2007/0272120 A1 | 11/2007 | Engels |
| 2007/0290385 A1 | 12/2007 | Holzner |
| 2007/0292597 A1 | 12/2007 | Ritzberger |
| 2008/0064011 A1 | 3/2008 | Rheinberger |
| 2008/0303181 A1 | 12/2008 | Noland |
| 2009/0023112 A1 | 1/2009 | Ganley |
| 2009/0130634 A1 | 5/2009 | Ganley |
| 2009/0181346 A1 | 7/2009 | Orth |
| 2010/0233658 A1 | 9/2010 | Ganley |
| 2011/0027742 A1 | 2/2011 | Fujisaki |
| 2011/0104643 A1 | 5/2011 | Giordano |
| 2011/0189636 A1 | 8/2011 | Thiel |
| 2011/0236855 A1 | 9/2011 | Rheinberger |
| 2011/0236857 A1 | 9/2011 | Rheinberger |
| 2011/0319254 A1 | 12/2011 | Ritzberger |
| 2012/0139141 A1 | 6/2012 | Khan |
| 2012/0196244 A1 | 8/2012 | Khan |
| 2012/0196737 A1 | 8/2012 | Holand |
| 2012/0214134 A1 | 8/2012 | Khan |
| 2013/0059272 A1 | 3/2013 | Jahns |
| 2013/0062801 A1 | 3/2013 | Giordano |
| 2013/0065200 A1 | 3/2013 | Giordano |
| 2013/0069264 A1 | 3/2013 | Giordano |
| 2013/0130201 A1 | 5/2013 | Smith |
| 2013/0221554 A1 | 8/2013 | Jung |
| 2013/0224454 A1 | 8/2013 | Jung |
| 2014/0010610 A1 | 1/2014 | Ganley |
| 2014/0023873 A1 | 1/2014 | Ganley |
| 2014/0106308 A1 | 4/2014 | Thiel |
| 2014/0377718 A1 | 12/2014 | Korten |
| 2015/0079542 A1 | 3/2015 | Smith |
| 2015/0140274 A1 | 5/2015 | Burke |
| 2015/0140513 A1 | 5/2015 | Burke |
| 2015/0173869 A1 | 6/2015 | Jung |
| 2015/0182315 A1 | 7/2015 | Okada |
| 2015/0246459 A1 | 9/2015 | Dorn |
| 2015/0282905 A1 | 10/2015 | Jahns |
| 2015/0374465 A1 | 12/2015 | Burke |
| 2016/0000538 A1 | 1/2016 | Park |
| 2016/0081777 A1 | 3/2016 | Yamada |
| 2017/0020639 A1* | 1/2017 | Jahns .................. C04B 35/64 |
| 2019/0099245 A1* | 4/2019 | Rothbrust ............. B32B 5/16 |

FOREIGN PATENT DOCUMENTS

| | | |
|---|---|---|
| CN | 103654981 | 3/2014 |
| CN | 103058655 | 9/2014 |
| CN | 103273713 | 12/2015 |
| DE | 19654055 | 11/1998 |
| DE | 19944130 | 4/2001 |
| DE | 102006021640 | 10/2007 |
| DE | 102006051294 | 4/2008 |
| DE | 102007034005 | 1/2009 |
| DE | 102009019447 | 11/2010 |
| DE | 102011055393 | 3/2016 |
| EP | 0455854 | 4/1994 |
| EP | 0850601 | 8/2009 |
| EP | 2024300 | 3/2013 |
| EP | 2610232 | 7/2013 |
| EP | 3088373 | 11/2016 |
| EP | 2674408 | 6/2017 |
| JP | 2004-035332 | 2/2004 |
| KR | 10-1221026 | 1/2013 |
| KR | 10-1324467 | 11/2013 |
| RU | 2454297 | 6/2012 |
| WO | WO 1990-013268 | 11/1990 |
| WO | WO 2001-032093 | 5/2001 |
| WO | WO 2002-009612 | 2/2002 |
| WO | WO 2002-085242 | 10/2002 |
| WO | WO 2007-137696 | 12/2007 |
| WO | WO 2008-083358 | 7/2008 |
| WO | WO 2009-154301 | 12/2009 |
| WO | WO 2010-057584 | 5/2010 |
| WO | WO 2013-122662 | 8/2013 |
| WO | WO 2013-156483 | 10/2013 |
| WO | WO 2014-062375 | 4/2014 |
| WO | WO 2014-124879 | 8/2014 |

* cited by examiner

MULTI-LAYERED ZIRCONIA DENTAL MILL BLANK AND PROCESS OF PRODUCTION

FIELD OF THE INVENTION

The invention relates to a pre-coloured zirconia dental mill blank having a layered structure.

The invention also relates to a process of producing such a dental mill blank, a process of producing a dental restoration out of such a dental mill blank and dental articles obtained or obtainable by applying such a process.

BACKGROUND ART

Dental mill blanks based on zirconia ceramic materials are described in various documents and are also commercially available.

Dental mill blanks are typically used for producing dental restorations (e.g. crowns and bridges) by a milling process. The zirconia material, the dental mill blank is made of, is typically in a pre-sintered and porous stage which facilitates its milling. The obtained dental article is then sintered to its final density before it is placed in the mouth of the patient.

A natural appearing tooth shows a colour and translucency gradient from dentin to enamel.

Enamel is more translucent and less colour intense compared to the dentin and therefore the top enamel area of a tooth is looking brighter compared to the bottom part of a tooth.

Pure zirconia, however, is white and does not match to the natural colour of the tooth in the mouth of a patient.

To address this issue, the milled zirconia dental ceramic is often treated with colouring solutions before sintering.

Another approach suggests to use zirconia mill blanks containing multiple coloured layers, so called multi-layer mill blanks, for producing dental restoration.

But using only two differently coloured materials does not give a natural gradient and therefore mill blanks with four or more differently coloured layers are suggested.

However, manufacturing a multi-layer mill blank containing many differently shaded raw materials makes the product expensive and the manufacturing process complicated. There is some patent literature related to this topic:

EP 2 024 300 B1 (Karlsruhe Institut für Technologie) describes a method for producing ceramic, wherein a green body, which consists of at least two different powder mixtures that are compacted to form a moulded body, said powder mixture respectively containing a ceramic powder and a colouring metal compound and/or colouring pigment, wherein each set of two powder mixtures differs in its composition of colouring metal compound and/or colour pigment, is initially produced and subsequently sintered, wherein the ceramics are shaped prior to sintering and/or as an intermediate step, during which sintering is interrupted and then continued after shaping and wherein the at least two powder mixtures have the same volume changes during sintering.

US 2008/064011 A1 (Rheinberger et al.) describes a multi-colored shaped body having layers arranged on top of one another comprising at least two successive and differently colored main layers and at least two differently colored intermediate layers between the at least two successive and differently colored main layers, wherein a change in color between the intermediate layers takes place in a direction which is contrary to the direction of the change in color between the main layers.

WO 2013/156483 A1 (Vita) describes a process for producing a non-dense sintered ceramic molded body having at least two layers, wherein a first powdery ceramic material forming a layer is contacted with at least a second powdery material forming at least a second layer; said first powdery material has a pre-sintering temperature T1 that is higher than the presintering temperature Ts of said at least second powdery ceramic material; the course of a curve of shrinkage S5 of said at least first powdery ceramic material differs from the course of a curve of shrinkage S2 of said at least second powdery material.

U.S. Pat. No. 8,936,848 B2 (Jung et al.) relates to a non-pre-coloured dental block device for producing a dental prosthesis, the dental block device comprising: a) a green body comprising zirconia; b) the green body having multiple different layers each having a different chemical composition between adjacent layers; c) the different chemical composition including different amounts of yttria between the adjacent layers; d) the green body being substantially opaque with a substantially consistent optical characteristic of non-translucency with respect to visible light across the layers; e) the green body having a brightness/lightness L* value between 10 to 20 for a sample thickness of 1 to 1.3 mm in accordance with CIE L*a*b* colorimetric system; and f) the green body being subsequently millable and sinterable to form the dental prosthesis with the multiple different layers having different optical characteristics of translucency. However, none of the suggested solutions is completely satisfying.

SUMMARY OF INVENTION

One objective of the invention described in the present text can be seen in providing a dental mill blank which can be used for producing high aesthetic dental restorations, wherein the dental mill blank should be easy to manufacture.

In particular, there is a desire to manufacture highly aesthetic dental restorations having the appearance of a natural looking tooth in a cost-efficient manner.

One or more of the above objectives can accomplished by providing a porous multi-layered coloured zirconia dental mill blank comprising
- a bottom layer B having the composition COMP-B which comprises ceramic components CER-COMP-B, colouring components COL-COMP-B and stabilizing components STAB-COMP-B,
- a top layer E having the composition COMP-E which comprises ceramic components CER-COMP-E, colouring components COL-COMP-E stabilizing components STAB-COMP-E,
- at least one intermediate layer $E_x$ having the composition COMP-E of top layer E,
- at least one intermediate layer $B_x$ having the composition COMP-B of bottom layer B,
- x being an integer and indicating the number of intermediate layers,
- wherein the layers with compositions COMP-B and COMP-E are arranged in alternating order, and
- wherein the thickness of the individual layers B, $B_x$ is decreasing from bottom to top and the thickness of the individual layers E, $E_x$ is decreasing from top to bottom.

In another embodiment, the invention relates to a process of producing a mill blank as described in the present text, the process comprising the steps of
- layering the chemical compositions COMP-B and COMP-E in alternating order one above the other,
- applying pressure,
- conducting a heat treatment step.

In another embodiment, the invention relates to a process for producing a dental article, the process comprising the steps of providing a mill blank as described in the present text,
machining an item out of the mill blank, the item having the shape of a dental restoration,
conducting a sintering step to obtain a sintered dental restoration.

The invention also relates to the use of a dental mill blank as described in the present text for producing dental articles.

Further, the invention relates to dental article obtained or obtainable from the mill blank described in the present text.

DEFINITIONS

Figure 1:
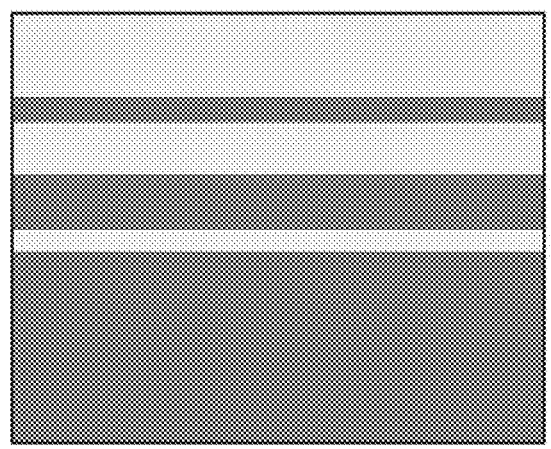
FIG. 1 shows a schematic view of a multi-layered dental mill blank as described in the present text with 6 layers, a bottom layer E, a top layer B, two intermediate layers $B_x$ and two intermediate layers $E_x$.

The term "dental article" means any article which is to be used in the dental or orthodontic field, especially for producing of or as dental restoration, a tooth model and parts thereof.

Examples of dental articles include crowns (including monolithic crowns), bridges, inlays, onlays, veneers, facings, copings, crown and bridged framework, implants, abutments, orthodontic appliances (e.g. brackets, buccal tubes, cleats and buttons), monolithic dental restorations (i.e. restorations which do not need to be veneered) and parts thereof. The surface of a tooth is considered not to be a dental article.

A dental article should not contain components which are detrimental to the patient's health and thus free of hazardous and toxic components being able to migrate out of the dental article.

By "dental mill blank" is meant a solid block (3-dim article) of material from which a dental article, dental workpiece, dental support structure or dental restoration can and typically is to be machined in any subtractive process, e.g. besides milling also by grinding, drilling etc.

A dental mill blank has a geometrically defined shape and comprises at least one flat surface. A so-called "free form surface" is not regarded as "geometrically defined". In this respect the shape of a dental restoration (e.g. crown or bridge) itself is not regarded as a dental mill blank.

"Zirconia article" shall mean a 3-dimensional article wherein at least one the x,y,z dimension is at least about 5 mm, the article being comprised of at least 80 or at least 90 or at least 95 wt. % zirconia.

"Ceramic" means an inorganic non-metallic material that is produced by application of heat. Ceramics are usually hard, porous and brittle and, in contrast to glasses or glass ceramics, display an essentially purely crystalline structure.

"Crystalline" means a solid composed of atoms arranged in a pattern periodic in three dimensions (i.e., has long range crystal structure as determined by X-ray diffraction).

Crystal structures include tetragonal, monoclinic, cubic zirconia and mixtures thereof.

"Monolithic dental restoration" shall mean a dental ceramic article onto the surface of which no facing or veneer has been attached. That is, the monolithic dental restoration is essentially comprised out of only one material composition. However, if desired a thin glazing layer can be applied.

"Glass" means an inorganic non-metallic amorphous material which is thermodynamically an under-cooled and frozen melt. Glass refers to a hard, brittle, transparent solid. Typical examples include soda-lime glass and borosilicate glass. A glass is an inorganic product of fusion which has been cooled to a rigid condition without crystallizing. Most glasses contain silica as their main component and a certain amount of glass former. The porous ceramic dental material described in the present text does not contain a glass.

"Glass-ceramic" means an inorganic non-metallic material where one or more crystalline phases are surrounded by a glassy phase so that the material comprises a glass material and a ceramic material in a combination or mixture. It is formed as a glass, and then made to crystallize partly by heat treatment. Glass ceramics may refer to a mixture of lithium-, silicon-, and aluminium-oxides.

The porous dental material described in the present text does not contain a glass-ceramic.

A "powder" means a dry, bulk composed of a large number of fine particles that may flow freely when shaken or tilted.

A "particle" means a substance being a solid having a shape which can be geometrically determined. The shape can be regular or irregular. Particles can typically be analysed with respect to e.g. grain size and grain size distribution.

"Density" means the ratio of mass to volume of an object. The unit of density is typically $g/cm^3$. The density of an object can be calculated e.g. by determining its volume (e.g. by calculation or applying the Archimedes principle or method) and measuring its mass.

The volume of a sample can be determined based on the overall outer dimensions of the sample. The density of the sample can be calculated from the measured sample volume and the sample mass. The total volume of the ceramic material can be calculated from the mass of the sample and the density of the used material. The total volume of cells in the sample is assumed to be the remainder of the sample volume (100% minus the total volume of material).

A "porous material" refers to a material comprising a partial volume that is formed by voids, pores, or cells in the technical field of ceramics. Accordingly an "open-celled" structure of a material sometimes is referred to as "open-porous" structure, and a "closed-celled" material structure sometimes is referred to as a "closed-porous" structure. It may also be found that instead of the term "cell" sometimes "pore" is used in this technical field. The material structure categories "open-celled" and "closed-celled" can be determined for different porosities measured at different material samples (e.g. using a mercury "Poremaster 60-GT" from Quantachrome Inc., USA) according to DIN 66133. A material having an open-celled or open-porous structure can be passed through by e.g. gases.

Typical values for an "open-celled" material are between 15% and 75% or between 18% and 75%, or between 30% and 70%, or between 34% and 67%, or between 40% and 68%, or between 42% and 67%.

The term "closed-celled" relates to a "closed porosity". Closed cells are those cells which are not accessible from the outside and cannot be infiltrated by gases under ambient conditions.

The "average connected pore diameter" means the average size of the open-celled pores of a material. The average connected pore diameter can be calculated as described in the Examples section.

The term "calcining" refers to a process of heating a solid material to drive off at least 90 percent by weight of volatile chemically bond components (e.g., organic components) (vs., for example, drying, in which physically bonded water is driven off by heating). Calcining is done at a temperature below a temperature needed to conduct a pre-sintering step.

The terms "sintering" or "firing" are used interchangeably. A porous ceramic article shrinks during a sintering step, that is, if an adequate temperature is applied. The sintering temperature to be applied depends on the ceramic material chosen. For $ZrO_2$ based ceramics a typical sintering temperature range is from 1100° C. to 1550° C. Sintering typically includes the densification of a porous material to a less porous material (or a material having less cells) having a higher density, in some cases sintering may also include changes of the material phase composition (for example, a partial conversion of an amorphous phase toward a crystalline phase).

A "solution" shall mean a composition containing solvent with soluble components dissolved therein. The solution is a liquid at ambient conditions.

"Colouring solution" is a solution comprising a solvent and colouring ions for colouring porous dental ceramics.

"Colouring ions" shall mean ions which have an absorption in the spectrum visible to the human eye (e.g. from 380 to 780 nm), which results in a coloured solution (visible to the human eye), if the colouring ions are dissolved in water (e.g. about 0.6 mol/l) and/or cause a colouring effect in the zirconia article which has been treated with the colouring solution and sintered afterwards.

A "fluorescing agent" shall mean an agent showing fluorescence in the region of visible light (380 to 780 nm).

By "machining" is meant milling, grinding, cutting, carving, or shaping a material by a machine. Milling is usually faster and more cost effective than grinding. A "machinable article" is an article having a 3-dimensional shape and having sufficient strength to be machined.

"Ambient conditions" mean the conditions which the inventive solution is usually subjected to during storage and handling. Ambient conditions may, for example, be a pressure of 900 to 1100 mbar, a temperature of 10 to 40° C. and a relative humidity of 10 to 100%. In the laboratory ambient conditions are adjusted to 20 to 25° C. and 1000 to 1025 mbar.

A composition is "essentially or substantially free of" a certain component, if the composition does not contain said component as an essential feature. Thus, said component is not wilfully added to the composition either as such or in combination with other components or ingredient of other components. A composition being essentially free of a certain component usually does not contain that component at all. However, sometimes the presence of a small amount of the said component is not avoidable e.g. due to impurities contained in the raw materials used.

As used herein, "a", "an", "the", "at least one" and "one or more" are used interchangeably. The terms "comprises" or "contains" and variations thereof do not have a limiting meaning where these terms appear in the description and claims. Also herein, the recitations of numerical ranges by endpoints include all numbers subsumed within that range (e.g., 1 to 5 includes 1, 1.5, 2, 2.75, 3, 3.80, 4, 5, etc.).

Adding an "(s)" to a term means that the term should include the singular and plural form. E.g. the term "additive(s)" means one additive and more additives (e.g. 2, 3, 4, etc.).

Unless otherwise indicated, all numbers expressing quantities of ingredients, measurement of physical properties such as described below and so forth used in the specification and claims are to be understood as being modified in all instances by the term "about".

The term "comprise" shall include also the terms "consist essentially of" and "consists of".

DETAILED DESCRIPTION OF THE INVENTION

The invention described in the present text provides a couple of advantages. This invention describes a multi-layer dental mill blank with an innovative layering concept.

The dental mill blanks described in the present text can be produced by using only two different powder compositions. The powder compositions for producing the dental mill blank differ from each other with respect to content and/or amount of colouring components.

The dental article which can be manufactured or obtained from this dental mill blank shows a smooth colour gradient after sintering.

The dental mill blank described in the present text allows the practitioner to produce highly aesthetic dental articles, including monolithic dental restoration.

Despite the fact that the dental article is obtained from a multi-layered coloured dental mill blank, the individual layers are not visible any longer by human eye once the dental article produced from the dental mill blank has been sintered. After sintering to a dense zirconia ceramic article, the intermediate layers diffuse unexpectedly resulting in a homogeneous colour transition between the top and the bottom layer.

It was found that for achieving a smooth colour gradient, the thickness of the individual layers should follow a certain order.

The thickness of the layers having the composition of the bottom layer should be decreasing from bottom to top of the dental mill blank.

The thickness of the layers having the composition of the top layer should be decreasing from top to bottom of the dental mill blank.

This is surprising as the intermediate layers located between the bottom layer and the top layer do not provide a colour gradient, but have alternating the same colour as the bottom layer and the top layer, respectively.

It was also found that the natural tooth like aesthetics can be even further improved, if the colour intensity of the individual layers is within a certain limit, in particular, if the calculated colour space $\Delta E_{E,B}$ is below or equal to 10 or below or equal to 9 or below or equal to 8.

$\Delta E_{E,B}$ can be calculated by applying the following formula:

$$\Delta E_{E,B} = \sqrt{(L^*_E - L^*_B)^2 + (b^*_E - a^*_B)^2 + (b^*_E - b^*_B)^2}$$

wherein:
$\Delta E_{E,B}$=colour space difference,
$L^*_E$=L* value for layer E,
$L^*_B$=L* value for layer B,
$a^*_E$=a* value for layer E,
$a^*_B$=a* value for layer B,
$b^*_E$=b* value for layer E,
$b^*_B$=b* value for layer B.

The respective measurement can be done as described in the example section.

Thus, the innovative layering concept described in the present text allows the manufacturing of highly aesthetic dental restorations with a smooth shade gradient.

Further, the dental mill blank described in the present text is easy to produce.

For producing the dental mill blank only two batches of different zirconia powders are needed, wherein each zirconia powder is doped with colouring components. This helps to reduce the manufacturing costs and simplifies the mode of production.

Further, using the dental mill blank described in the present text eliminates the need to apply an additional colouring step to the porous dental article machined from the dental mill blank, e.g. by using a colouring solution.

The dental mill blank comprises a bottom layer B and a top layer E.

Between the bottom layer E and the top layer E there are at least two intermediate layers $E_x$ and B. The subscript "x" is an integer indicating the number of intermediate layers. "x" is typically within a range from 1 to 8 or from 1 to 5 for intermediate layers $E_x$ and $B_x$, respectively.

If there are more than two intermediate layers, the intermediate layers $E_x$ and $B_x$ are arranged in alternating order.

The individual layers are essentially flat and not curved, i.e. they are arranged essentially parallel to the bottom layer and top layer.

According to one embodiment, the mill blank has in total 4 layers, or 5 layers, or 6 layers, or 7 layers or 8 layers.

Bottom layer B and top layer E are typically thicker than intermediate layers $E_x$ and intermediate layers B.

Bottom layer B is typically thicker than top layer E.

The thickness of the intermediate layers $E_x$ and intermediate layers $B_x$ is typically in the same range.

The thickness of the layers is typically as follows:
bottom layer B: from 5 to 25 mm or from 7 to 24 mm;
top layer E: from 5 to 10 mm or from 4 to 2 mm;
intermediate layer $E_x$: from 0.6 to 4 mm or from 0.6 to 2 mm;
intermediate layer $B_x$: from 0.6 to 4 mm or from 0.6 to 2 mm.

According to one example, a dental mill blank can thus have the following structure:
Bottom layer B having a thickness B0 in the range from 5 to 25 mm;
Intermediate layer E1 having a thickness in the range from 0.6 to 2 mm,
Intermediate layer B1 having a thickness in the range from 0.6 to 2 mm,
Top layer E having a thickness E0 in the range from 5 to 10 mm.

According to another example, a dental mill blank can thus have the following structure:
Bottom layer B having a thickness B0 in the range from 5 to 25 mm;
Intermediate layer E1 having a thickness in the range from 0.6 to 1 mm,
Intermediate layer B1 having a thickness in the range from 0.8 to 2 mm,
Intermediate layer E2 having a thickness in the range from 0.8 to 2 mm,
Intermediate layer B2 having a thickness in the range from 0.6 to 1 mm,
Top layer E having a thickness E0 in the range from 5 to 10 mm.

That is, the thickness of the layers is as follows: B0>B1>B2 and E0>E2>E1.

A schematic view of such a mill blank (vertical cut) is shown in FIG. 1.

The dental mill blank of FIG. 1 has 6 layers, a bottom layer E, a top layer B, two intermediate layers $B_x$ and two intermediate layers $E_x$. The thickness of the layers E, $E_x$ decreases from bottom to top, whereas the thickness of the layers B, $B_x$ increases from bottom to top.

The dental mill blank has typically the shape of a block or disc.

The disc can be a circular, square, round, elliptical or may have circular, square, round, elliptical or circular elements.

If the dental mill blank has the shape of a block, the dental mill blank has typically the following dimensions:
x-dimension: from 30 to 45 mm, or from 35 to 40 mm,
y-dimension: from 50 to 70 mm, or from 55 to 65 mm,
z-dimension: from 10 to 30 mm, or from 15 to 25 mm.

If the dental mill blank has the shape of a disc, the dental mill blank has typically the following dimensions:
x, y-dimension: from 90 to 110 mm, or from 95 to 105 mm,
z-dimension: from 5 to 35 mm, or from 10 to 30 mm.

The dental mill blank described in the present text is porous and has a multi-layered structure.

The dental mill blank can typically be characterized by one or more or all of the following parameters:
raw breaking resistance: from 20 to 70 or from 30 to 60 or from 35 to 55 MPa determined according to ISO 6872:2015 applying the punch on 3 balls test adapted to measurement in porous state (measurement set up: 3.6 mm punch diameter, 0.1 mm/min load speed, 2 mm sample thickness, support ball diameter 6 mm, 14 mm diameter of supporting balls);
porosity: from 30 to 70 or from 35 to 60 or from 40 to 55%;
average connected pore diameter: from 0.010 to 0.190 or from 0.050 to 0.150 μm;
density: from 2 to 4 $g/cm^3$ or from 2.5 to 3.5 $g/cm^3$.

The compositions (COMP) of the individual layers (B, E, $E_x$, $B_x$) of the mill blank described in the present text comprises ceramic components (CER-COMP), colouring components (COL-COMP) and stabilizing components (STAB-COMP).

The bottom layer B has the composition COMP-B and comprises ceramic components CER-COMP-B, colouring components COL-COMP-B and stabilizing components STAB-COMP-B.

The top layer E has the composition COMP-E and comprises ceramic components CER-COMP-E, colouring components COL-COMP-E stabilizing components STAB-COMP-E.

The at least one intermediate layer $E_x$ has the composition COMP-E of top layer E.

The at least one intermediate layer $B_x$ has the composition COMP-B of bottom layer B.

According to one embodiment, the mill blank does not comprise layers having a composition other than COMP-B or COMP-E.

According to one embodiment, at least one of the compositions COMP-B or COMP-E comprises in addition a fluorescing agent.

According to one embodiment, both compositions COMP-B and COMP-E comprise in addition a fluorescing agent.

According to a further embodiment, both compositions COMP-B and COMP-E comprise a fluorescing agent, wherein the concentration of the fluorescing agent in composition COMP-B is higher than the concentration of the fluorescing agent in composition COMP-E.

This allows to further improve the aesthetics of the final dental article (after sintering).

It was found that natural teeth show a certain degree of fluorescence and that the fluorescence is not uniformly allocated. The concept described in the present text allows to adjust the fluorescence accordingly.

The ceramic components CER-COMP-E and CER-COMP-B are typically selected from oxides of Zr, Hf, Al and mixtures thereof.

The stabilizing components STAB-COMP-B and STAB-COMP-E are typically selected from oxides of Y, Mg, Ca, Ce and mixtures thereof (e.g. $Y_2O_3$, MgO, CaO, $CeO_2$).

The colouring components COL-COMP-B and COL-COMP-E are typically selected from oxides of Fe, Mn, Cr, Ni, Er, Pr, Nd, Tb, in particular from the oxides of Mn, Er, Pr, Tb and mixtures thereof (e.g. $Fe_2O_3$, $MnO_2$, $Cr_2O_3$, NiO, $Er_2O_3$, $Pr_2O_3$, $Nd_2O_3$, $Tb_4O_7$).

If present, the fluorescing agent is typically selected from oxides of Bi and mixtures thereof.

Typically, composition COMP-B is more colour intense than composition COMP-E.

The ratio with respect to weight of colouring components based on the weight of the oxides contained in composition COL-COMP-B to the colouring components based on the weight of the oxides contained in composition COL-COMP-E being in a range from 0.2 to 5 or in a range from 0.3 to 3.75 or in a range from 0.35 to 2.15.

Working within this ratio makes it possible to provide multi-layer dental mill blanks which are suitable for producing dental restorations, dental restorations which show a smooth colour gradient after sintering.

The difference in colour intensity expressed as colour space value $\Delta E_{E,B}$ (calculated according to the above mentioned equation) for composition COMP-B and COMP-E is typically below 10 or below 9 or below 8.

The ratio described in the present text works in particular well, if the colouring components contained in COL-COMP-B and COL-COMP-E are selected from oxides of Mn, Er, Pr, Tb and mixtures thereof.

Compositions COMP-B and COMP-E can be produced by processes known to the person skilled in the art.

Possible production methods include spray-drying the respective components of the compositions or mixing the respective components being provided as powders.

The ceramic components are typically present in an amount from 80 to 95 wt. % or from 85 to 95 wt. % or from 90 to 93 wt. % with respect to the weight of the dental mill blank.

The colouring components are typically present in an amount from 0.01 to 1 wt. % or from 0.02 to 0.8 wt. % or from 0.03 to 0.5 wt. % with respect to the weight of the dental mill blank.

The stabilizing components are typically present in an amount from 3 to 12 wt. % or from 5 to 10 wt. % or from 6 to 10 wt. % with respect to the weight of the dental mill blank.

If present, the fluorescing agent is typically present in an amount from 0 to 1 wt. % or from 0.005 to 0.8 wt. % or from 0.01 to 0.1 wt. % with respect to the weight of the dental mill blank.

For obtaining a highly aesthetic dental article, the following concentrations were found to be useful, wherein the wt. % are calculated for the respective oxides:

ceramic components: from 85 to 95 wt. % or from 85 to 95 wt. %,
colouring components: from 0.01 to 1 wt. % or from 0.02 to 0.8 wt. %,
stabilizing components: from 3 to 12 wt. % or from 5 to 10 wt. %,
fluorescing agent: from 0 to 1 wt. % or from 0.005 to 0.8 wt. %, wt. % with respect to the weight of the dental mill blank.

The mill blank described in the present text does typically not comprise one or more of the following elements/components:
glass or glass ceramic;
oxides of Si, Fe, K, Na in an amount above 1 wt. % with respect to the weight of the mill blank.

The presence of these elements may negatively affect the overall performance of the mill blank during machining or sintering the machined articles.

Further, the process for producing a dental article from the mill blank described in the present text does not require the application of a colouring solution to the surface of the pre-sintered article machined from the mill blank.

According to one embodiment, the invention relates to a mill blank as described in the present text with:
a bottom layer B having the composition COMP-B which comprises ceramic components CER-COMP-B, colouring components COL-COMP-B and stabilizing components STAB-COMP-B,
a top layer E having the composition COMP-E which comprises ceramic components CER-COMP-E, colouring components COL-COMP-E stabilizing components STAB-COMP-E,
at least one intermediate layer $E_x$ having the composition of top layer E,
at least one intermediate layer $B_x$ having the composition of bottom layer B,
x being an integer and indicating the number of intermediate layers,
the layers with compositions COMP-B and COMP-E being arranged in alternating order,
the thickness of the individual layers B, $B_x$ decreasing from bottom to top,
the thickness of the individual layers E, $E_x$ decreasing from top to bottom,
the ceramic components of CER-COMP-E and CER-COMP-B being selected from oxides or Zr, Hf, Al and mixtures thereof,
the stabilizing components of STAB-COMP-B and STAB-COMP-E being selected from oxides of Y, Mg, Ca, Ce and mixtures thereof,
the colouring components of COL-COMP-B and COL-COMP-E being selected from the oxides of Mn, Er, Tb and mixtures thereof,
at least one of the chemical compositions COMP-B or COMP-E comprising in addition a fluorescing agent,
the ceramic components, stabilizing components and optionally the colouring components contained in all the layers being the same.

The mill blank described in the present text can be produced as follows:
layering compositions COMP-B and COMP-E in alternating order one above the other,
applying pressure,
optionally conducing a calcining step,
conducting a heat treatment step.

Compositions COMP-B and COMP-E are typically provided in the form of two powder batches, each powder batch comprising ceramic components doped with colouring components.

Typically, a layer of composition COMP-B is placed in a mould. This layer corresponds to bottom layer B.

Above the layer of composition COMP-B, a layer of composition COMP-E is applied. This layer corresponds to intermediate layer E1.

In a further step, above intermediate layer E1, a further layer of composition COMP-B is applied. This layer corresponds to intermediate layer B1.

If desired, the above two steps can be repeated to provide further intermediate layers $E_x$ and $B_x$ in alternating order.

In a further step, above intermediate layer B1 a further layer of composition E is applied. This layer corresponds to the top layer E.

The layering can be accomplished by using a scraper or blade.

The mould typically has the shape (in x, y direction) of the dental mill blank to be produced. To simplify the production process, the bottom of the mould can be moved up and down.

If desired, after each layering step a pressing step can be done to compact the respective powder composition.

Alternatively or in addition, a pressing step is applied to the final multi-layered powder composition.

The pressure applied is typically with in a ranger form 100 to 300 MPa or from 150 to 200 MPa.

If desired, a calcining step can be done.

In a further step, a heat treatment is applied to the multi-layered powder and compacted composition to obtain a porous mill blank.

The temperature of the heat treatment is typically with in a range from 800 to 1100° C. or from 900 to 1,000° C.

The heat treatment is typically applied for a duration from 30 to 70 hours or from 35 to 60 hours.

The dental mill blank is provided to the customer in a form allowing the fixation of the dental mill blank in a milling machine.

Either the top or bottom surface of the dental mill blank typically contains a marking element (e.g. printing or carving) which facilitates the correct orientation of the dental mill blank in the milling machine.

The dental mill blank described in the present text is typically provided to the practitioner with an instruction of use to form a kit of parts.

The instruction of use contains hints for what purpose the dental mill blank is intended to be used, how the machining should be done and what sintering conditions should be applied.

If desired, the kit of parts may further comprise one or more of the following items: sintering aids, shade guide, polishing aids, colouring liquids or combination thereof.

The invention is also directed to the use of the dental mill blank described in the present text for producing dental articles.

Useful dental articles include: crowns (including monolithic crowns), bridges, inlays, onlays, veneers, facings, copings, crown and bridged framework, implants, abutments, orthodontic appliances (e.g. brackets, buccal tubes, cleats and buttons), monolithic dental restorations (i.e. restorations which do not need to be veneered) and parts thereof.

A process of producing a dental article out of the dental mill blank described in the present text typically comprises the steps of:

providing a dental mill blank as described in the present text, machining an item out of the dental mill blank, the item having the shape of a dental article, conducting a sintering step to obtain a sintered dental article.

The following sintering conditions are considered useful:

temperature: from 1,400 to 1,550° C. or from 1,450 to 1,500° C.;

pressure: ambient conditions (e.g. 750 to 1,030 hPa), duration: from 1 to 15 hours or from 1 to 10 hours or from 1 to 5 hours or from 1 to 3 hours.

The dental article obtained or obtainable according to the process described in the present text can be characterized by one or more or all of the following elements:

a) being tooth coloured;
b) having a density in the range of 5.5 to 6.1 g/cm³;
c) having a biaxial flexural strength in the range of 500 to 1,500 MPa;
d) being fluorescent;

According to one embodiment, the dental article shows an essentially constant decrease of the b* value from bottom to top, wherein the bottom is the region of the dental article close to the gingiva and the top is the region of the dental article close to the incisal area. "Essentially constant" means that the change of the b* value is not more than 2 points over a distance of 2 mm of the dental article.

The dental article may have the shape of a crown, bridge, inlay, onlay, veneer, facing, coping, crown and bridged framework, implant, abutment, orthodontic appliance, monolithic dental restorations and parts thereof.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. The above specification, examples and data provide a description of the manufacture and use of the compositions and methods of the invention. The invention is not limited to the embodiments disclosed herein. One skilled in the art will appreciate that many alternative embodiments of the invention can be made without departing from the spirit and scope of thereof.

The following examples are given to illustrate, but not limit, the scope of this invention. Unless otherwise indicated, all parts and percentages are by weight.

EXAMPLES

Unless otherwise indicated, all parts and percentages are on a weight basis, all water is de-ionized water, and all molecular weights are weight average molecular weight. Moreover, unless otherwise indicated all experiments were conducted at ambient conditions (23° C.; 1013 mbar).

Methods

Fluorescence

If desired, the fluorescence properties can be determined using an optical setup comprising the following parts (particularly suited for sharp emission bands): GC America G-Light as light source, irradiating light of around 409 nm wavelength, an Ulbricht sphere, fibre optics from Topsensor Systems as light conductor and an A/D converter. A sample having the shape of a disc (diameter >10 mm, thickness of 1.0 mm) can be used to cover the opening of the Ulbricht sphere. The light emission spectrum of the sample can be measured while trans-illuminating it with exitation radiation (violet light). Excitation radiation of shorter wavelengths is also suited for fluorescence measurements.

Another option is to measure the remission spectrum of the samples e.g. with a spectrophotometer (e.g. Colour i7; X-Rite). Typically two measurements are done: one remission spectrum using irradiation e.g. of the D65 light source including the UV range and one remission spectrum with irradiation e.g. of the D65 light source excluding the UV range. Subsequently both spectra are subtracted from each other, the yielding curve showing the fluorescence effect(s). The area between 410 nm and 540 nm is defined as the area of fluorescence, while the area between 550 nm and 710 nm is defined as the background. The signal intensity of the background area is subtracted from the signal intensity of the fluorescence area to obtain the relative fluorescence intensity.

Choosing this measurement method can be preferred, because it also yields colour information about the sample (i.e. L*a*b* values).

Alternatively, the samples can be placed in an UV-light box used for inspection of e.g. thin layer chromatography plates. If desired, fluorescence can be detected by the human eye as by the lightening up of the sample against the black background.

Density

If desired, the density of the sintered material can be measured by an Archimedes technique. The measurements is made on a precision balance (identified as "AE 160" from Mettler Instrument Corp., Hightstown, N.J.) using a density determination kit (identified as "ME 33360" from Mettler Instrument Corp.). In this procedure the sample is first weighed in air (A), then immersed in water (B). The water is distilled and deionized. One drop of a wetting agent (obtained under trade designation "TERGITOL-TMN-6" from Dow Chemical Co., Danbury, Conn.) is added to 250 ml of water. The density is calculated using the formula $\rho=(A/(A-B))\rho 0$, where $\rho 0$ is the density of water. The relative density can be calculated by reference to the theoretical density ($\rho t$) of the material, $\rho_{rel}=(\rho/\rho t)100$.

Biaxial Flexural Strength

If desired, the biaxial flexural strength can be determined according to ISO 6872:2015 with the following modifications: The sample is sawn into wafers with a thickness of 1 to 2 mm using a dry cut saw. The diameter of the samples should be between 12 and 20 mm. Each wafer is centred on a support of three steel balls with a support diameter of 14 mm. The punch diameter in contact with the wafer is 3.6 mm. The punch is pushed onto the wafer at a rate of 0.1 mm per min. A minimum of 6 samples is measured to determine the average strength. The tests can be conducted in an Instron 5566 universal testing machine (Instron Deutschland GmbH).

Colour Determination

If desired, the L*a*b* values can be determined using a halogen light source (HL2000, Mikropak, optical fibre with 200µ diameter), a spectrometer (Ocean Optics S2000, optical fibre with 50 µm) and a linear drive. The measurement starts at the area comprising COMP-B. In 1 mm steps shade values L*, a* and b* where recorded by the spectrometer with an integration time of 20 seconds each position. The measurement of shade values is conducted perpendicular to the layering in direction to the area comprising COMP-E.

Porosity:

If desired, the porosity can be determined as follows: Porosity=(1−(density of porous material/density of sintered material))×100. The density of the porous material can be calculated by the division of weight and volume. Volume can be obtained by geometrical measurements.

Average Connected Pore Diameter

If desired, the average connected pore diameter can be determined as follows: Mercury is introduced in the porous material under high pressure using a porosimeter (Quantachrome Poremaster). The applied pressure is related to pore size by the opposing force of the surface tension of Mercury. Using the so-called Washburn equation, the average connected pore diameter can be determined. Following measurement parameters are applied or used for result calculation: Pressure range from 20 to 60000 PSIA, penetrometer constant 1567 mV/cm$^3$, temperature during measurement 20° C., Hg Contact Angle 140° and Hg Surface Tension 480 mN/m.

Materials

| Powder Composition (COMP-B) | |
| --- | --- |
| $ZrO_2$, $HfO_2$: | 90.5 wt. % |
| $Al_2O_3$: | 0.1 wt. % |
| $Y_2O_3$: | 8.9 wt. % |
| $Er_2O_3$: | 0.4 wt. % |
| $Tb_4O_7$: | 0.08 wt. % |
| $MnO_2$: | 0.001 wt. % |
| $Bi_2O_3$: | 0.03 wt. % |

| Powder Composition (COMP-E) | |
| --- | --- |
| $ZrO_2$, $HfO_2$: | 90.3 wt. % |
| $Al_2O_3$: | 0.1 wt. % |
| $Y_2O_3$: | 9.3 wt. % |
| $Er_2O_3$: | 0.2 wt. % |
| $Tb_4O_7$: | 0.03 wt. % |
| $MnO_2$: | 0.001 wt. % |
| $Bi_2O_3$: | 0.03 wt. % |

Process for Producing Mill Blanks

General Description

Mill blank samples were produced by using the above described powder compositions. The following steps were applied: Filling the powder compositions COMP-B and COMP-E in alternating order in a mould (diameter: 24.9 mm). Applying pressure (185 MPa) to the powder filling. Demoulding the compacted body. Applying a heat treatment at 970° C. for 2 hours.

Process for Producing Test Samples

General Description

Samples were cut from the heat treated body perpendicular to the powder layering (sample dimensions: 1.6 mm×18.5 mm (height)×25.6 mm). The samples were sintered at 1500° C. for 2 hours. The sintered samples were polished using a suspension with 20 µm and 9 µm diamonds on rotating polishing textiles until no scratches are visible.

Mill Blank (MB 2P/6L): "2 powders/6 layers"

Filling 17 mm of a mould with powder composition COMP-B, followed by filling 1.2 mm with powder composition COMP-E, followed by filling 2 mm with powder composition COMP-B, followed by filling 2 mm with powder composition COMP-E, followed by filling 1.2 mm with powder composition COMP-B, followed by filling 17 mm with powder composition COMP-E, Mill Blank (MB 2P/2L): "2 powders/2 layers"
Filling 20 mm of a mould with powder composition COMP-B,
followed by filling 20 mm with powder composition COMP-E.

Evaluation

The Test Samples were analysed with respect to the change of a* and b* shade value perpendicular to the powder layering. This direction reflects the orientation of a dental restoration within a layered mill blank. The measurement starts in area consisting of COMP-B and ends in the area consisting of COMP-E. The results are graphically shown in FIGS. 2 and 3.

Findings

Figure 2:
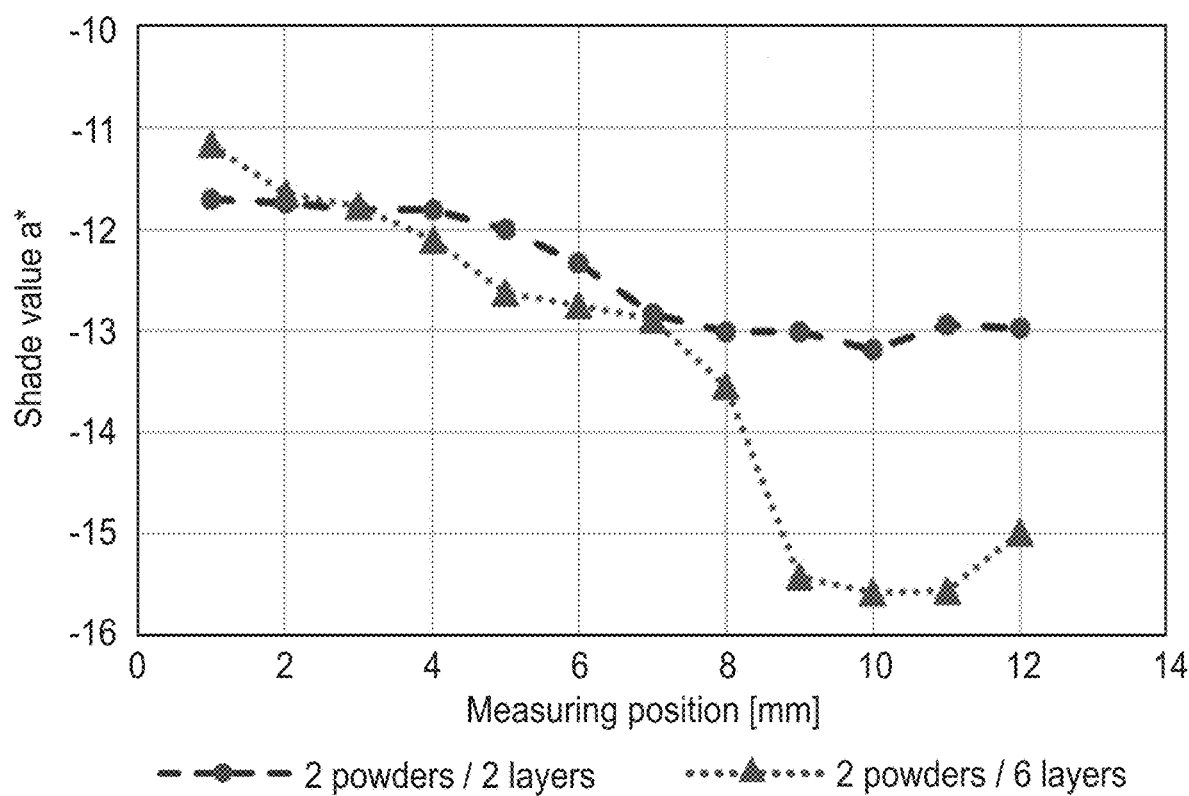
FIG. 2 shows the development of the value a* in relation to the z-direction (height) of the dental mill blank as described in the present text in comparison to a dental mill blank without intermediate layers.

As shown in FIG. 2, for MB 2P/2L the value for a* (red shade) changed by 1 points, whereas for MB 2P/6L the respective values changed by 4 points. Thus, for MB 2P/6L a decreased red shade in the COMP-E region compared to the COMP-B region was obtained.

This is beneficial because the region of the block relating to the incisal area of the tooth shows a less intensive red hue.

Figure 3:
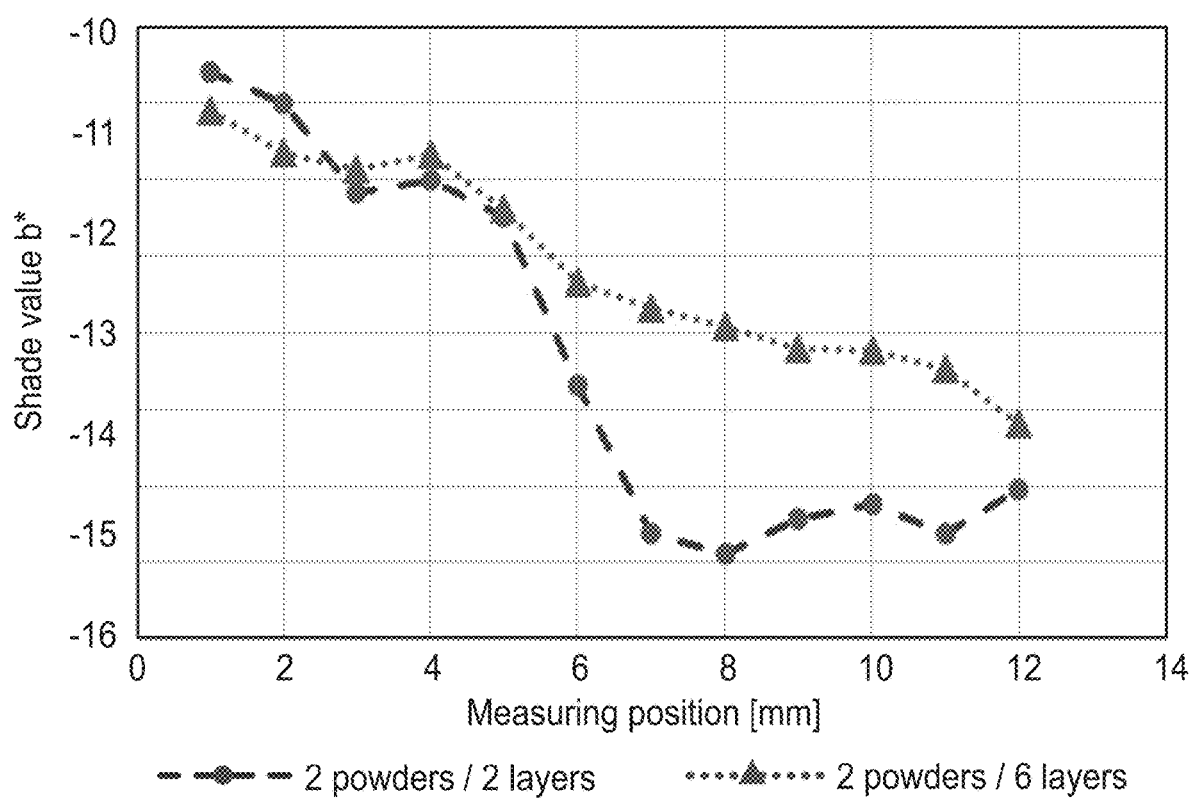
FIG. 3 shows the development of the value b* in relation to the z-direction (height) of the dental mill blank as described in the present text in comparison to a dental mill blank without intermediate layers.

As shown in FIG. 3, for MB 2P/2L the value for b* (yellow shade) decreased by 5 points within 2 mm, whereas for MB 2P/6L it decreased smoothly from COMP-B to COMP-E.

This is beneficial because a natural tooth also typically shows a smooth transition of the yellow hue to a blue hue.

Thus, overall a smooth shade gradient could be achieved by a subsequent layering of two powder types that fit to the appearance of a natural tooth with a bright enamel and a shade intensive body part.

The invention claimed is:

1. A porous multi-layered coloured zirconia dental mill blank, comprising:
    a bottom layer B comprising:
        a composition COMP-B comprising:
            ceramic components CER-COMP-B,
            colouring components COL-COMP-B, and
            stabilizing components STAB-COMP-B;
    a top layer E comprising:
        a composition COMP-E comprising:
            ceramic components CER-COMP-E,
            colouring components COL-COMP-E, and
            stabilizing components STAB-COMP-E,
        wherein one or more of CER-COMP-B and CER-COMP-E comprises zirconia;
    at least one intermediate layer $E_x$ comprising the composition COMP-E; and
    at least one intermediate layer $B_x$ comprising the composition COMP-B;
        wherein the layers with compositions COMP-B and COMP-E are arranged top to bottom in an alternating order, and
        wherein each of the layers B and $B_x$ have a thickness, wherein the thickness increases from top to bottom, and
        wherein each of the layers E and $E_x$ have a thickness, wherein the thickness decreases from top to bottom.

2. The mill blank of claim 1 not comprising layers having a composition other than COMP-B or COMP-E.

3. The mill blank of claim 1, the difference in colour intensity expressed as colour space value $\Delta E_{E,B}$ for composition COMP-B and COMP-E being below 10.

4. The mill blank of claim 1, the thickness of the layers being as follows:
    bottom layer B: from 7 to 24 mm;
    top layer E: from 5 to 10 mm;
    intermediate layer $E_x$: from 0.6 to 4 mm; and
    intermediate layer $B_x$: from 0.6 to 4 mm.

5. The mill blank of claim 1, being characterized by at least one or more of the following features:
    raw breaking resistance: 20 to 70 MPa determined according to ISO 6872:2015 applying the punch on 3 balls test adapted to measurement in porous state;
    porosity: 30 to 70%;
    average connected pore diameter: 0.010 to 0.190 µm;
    density: from 2 to 4 g/cm³.

6. The mill blank of claim 1, at least one of the compositions COMP-B or COMP-E comprising a fluorescing agent.

7. The mill blank of claim 1, both compositions COMP-B and COMP-E comprising a fluorescing agent, the concentration of the fluorescing agent in composition COMP-B being preferably higher than the concentration of the fluorescing agent in composition COMP-E.

8. The mill blank of claim 1, the ceramic components being present in an amount from 80 to 95 wt. % with respect to the weight of the mill blank.

9. The mill blank of claim 1, the colouring components being present in an amount from 0.01 to 1 wt. % with respect to the weight of the mill blank.

10. The mill blank of claim 1, the stabilizing components being present in an amount from 3 to 12 wt. % with respect to the weight of the mill blank.

11. The mill blank of claim 1, comprising
    a bottom layer B having the composition COMP-B which comprises ceramic components CER-COMP-B, colouring components COL-COMP-B and stabilizing components STAB-COMP-B;
    a top layer E having the composition COMP-E which comprises ceramic components CER-COMP-E, colouring components COL-COMP-E stabilizing components STAB-COMP-E;
    at least one intermediate layer $E_x$ having the composition of top layer E;
    at least one intermediate layer $B_x$ having the composition of bottom layer B,
    the layers with compositions COMP-B and COMP-E being arranged in alternating order,
    the thickness of the individual layers B, $B_x$ decreasing from bottom to top,
    the thickness of the individual layers E, $E_x$ decreasing from top to bottom;
    the ceramic components of CER-COMP-E and CER-COMP-B being selected from oxides of Zr, Hf, Al and mixtures thereof;
    the stabilizing components of STAB-COMP-B and STAB-COMP-E being selected from oxides of Y, Mg, Ca, Ce and mixtures thereof;
    the colouring components of COL-COMP-B and COL-COMP-E being selected from the oxides of Mn, Er, Tb and mixtures thereof;
    at least one of the chemical compositions COMP-B or COMP-E comprising a fluorescing agent; and
    the ceramic components, stabilizing components and optionally the colouring components contained in all the layers being the same.

12. A process of producing a mill blank as described in claim 1, the process comprising:
   layering compositions COMP-B and COMP-E in alternating order one above the other;
   applying pressure; and
   conducting a heat treatment step.

13. A process for producing a dental article, the process:
   providing a mill blank as described in claim 1;
   machining an item out of the mill blank, the item having the shape of a dental article; and
   conducting a sintering step to obtain a sintered dental article.

14. A dental article obtained by a process as described in claim 13.

* * * * *

UNITED STATES PATENT AND TRADEMARK OFFICE
CERTIFICATE OF CORRECTION

| | | |
|---|---|---|
| PATENT NO. | : 10,898,302 B2 | Page 1 of 1 |
| APPLICATION NO. | : 16/095433 | |
| DATED | : January 26, 2021 | |
| INVENTOR(S) | : Rainer Dittmann et al. | |

It is certified that error appears in the above-identified patent and that said Letters Patent is hereby corrected as shown below:

In the Specification

Column 6,

Line 58-59, delete " $\Delta E_{E,B} = \sqrt{(L^*_E - L^*_B)^2 + (b^*_E - a^*_B)^2 + (b^*_E - b^*_B)^2}$ " and insert -- $\Delta E_{E,B} = \sqrt{(L^*_E - L^*_B)^2 + (a^*_E - a^*_B)^2 + (b^*_E - b^*_B)^2}$ --, therefor.

Signed and Sealed this
Twenty-fourth Day of October, 2023

Katherine Kelly Vidal
*Director of the United States Patent and Trademark Office*